United States Patent [19]

Stratta et al.

[11] 3,917,357
[45] Nov. 4, 1975

[54] ELECTRONIC ANTI-SKID BRAKING SYSTEM FOR VEHICLES

[75] Inventors: Adriano Stratta, Turin; Enrico Bruni, Ferrara, both of Italy

[73] Assignee: Fiat Societa per Azioni, Turin, Italy

[22] Filed: June 25, 1974

[21] Appl. No.: 482,926

[30] Foreign Application Priority Data
Oct. 22, 1973 Italy.................................. 70102/73

[52] U.S. Cl.......................... 303/21 CG; 188/181 A
[51] Int. Cl.²........................................... B60T 8/08
[58] Field of Search ............ 188/181 A; 303/20, 21; 307/10 R; 317/5; 324/162; 340/53, 62, 262

[56] References Cited
UNITED STATES PATENTS 3,652,133   3/1972   Yamazaki et al. ............. 303/21 CG Primary Examiner—Duane A. Reger
Assistant Examiner—Stephen G. Kunin
Attorney, Agent, or Firm—Sughrue, Rothwell, Mion, Zinn & Macpeak

[57] ABSTRACT

In a vehicle antiskid braking system each brake release cycle of antiskid braking control is initiated by an electronic comparator circuit which compares an acceleration signal derived from a vehicle wheel with a threshold signal. To prevent undesirable intervention of the antiskid braking system in response to the high brake fluid pressure upon full depression of the brake pedal the threshold signal is increased by an auxiliary voltage which prevents immediate intervention of the antiskid braking system upon first applying the brakes, but which decays to zero before the subsequent cycles of brake application and release under the normal antiskid threshold control.

1 Claim, 3 Drawing Figures

ELECTRONIC ANTI-SKID BRAKING SYSTEM FOR VEHICLES

FIELD OF THE INVENTION

The invention relates to an antiskid braking system for vehicles.

DESCRIPTION OF PRIOR ART

A large number of vehicle antiskid braking systems are provided with a sensor of the angular velocity of a wheel a threshold comparator which compares the rate of change of such velocity with respect of a predetermined value and an hydraulic or pneumatic actuator which controls the application or the release of the brakes associated with that wheel, in dependence upon the dynamic parameters of the wheel and the vehicle.

It frequently occurs that in the first cycle of intervention of such anti-skid braking systems the pressure in the pneumatic or hydraulic system builds up rather quickly. This may cause the wheel to lock as a result of the applied pressure which would subsequently settle within the normal operating range.

SUMMARY OF THE INVENTION

With a view to avoiding this abnormal operation it is an object of the present invention to provide a method of controlling the operation of a vehicle anti-skid braking system.

According to the invention there is provided a vehicle anti-skid wheel braking system which, depending on the dynamic conditions of the vehicle, controls successive cycles of brake application and release, each brake release cycle being initiated by comparison of a wheel deceleration signal with a predetermined threshold, characterised in that for the first of said cycles of brake release the threshold value which the wheel deceleration signal has to exceed to initiate the brake release is set at a higher value than the said predetermined value.

The present invention affords the practical advantage of avoiding undesirable intervention of the antiskid braking system which would otherwise occur with a conventional anti-skid braking system immediately full braking was applied.

BRIEF DESCRIPTION OF THE DRAWINGS

The invention will now be described, by way of example, with reference to the accompanying drawings, in which:

In FIG. 1 the abscissa represents time ($t$) while vehicle speed ($V_v$) and wheel speed ($V_r$) are represented on the ordinates. A wheel velocity sensor comprises a transducer 20 (FIG. 2) which measures the angular velocity of a wheel 22 of a vehicle 24 which has a master cylinder 26 controlled by an electronic control device 28. The master cylinder 26 prevents a rapid and unacceptable build-up of the braking pressure when a brake pedal 32 is depressed, such pressure being controlled by a brake pressure actuator 30 controlled, in turn, by the electronic device 28. The actuator 30 controls the fluid pressure applied to a wheel brake actuator 34. Since the build-up of the braking pressure when the brake pedal 32 is depressed depends exclusively upon the driver and not on the electronic control, the full depression of the pedal 32 may cause the braking pressure to increase to values which cannot be allowed in the braking system. Such high pressures would be interpreted as a correspondingly high wheel deceleration command which, if it is higher than the preset threshold, would cause an appropriate threshold circuit within device 28 to trip, thereby wrongly indicating the beginning of a locked wheel condition.

According therefore to the present invention, in the first brake release cycle of operation of the anti-skid braking system, the threshold value at which such release is commanded is increased to a value which cannot in practice be exceeded by actual wheel deceleration values.

Figure 1:
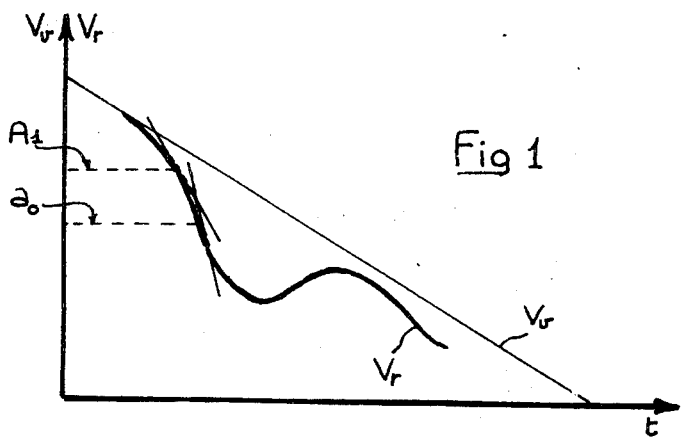
FIG. 1 is a graphical representation of the variation with time of the speed of a vehicle wheel and of the vehicle itself during antiskid braking.
Figure 2:
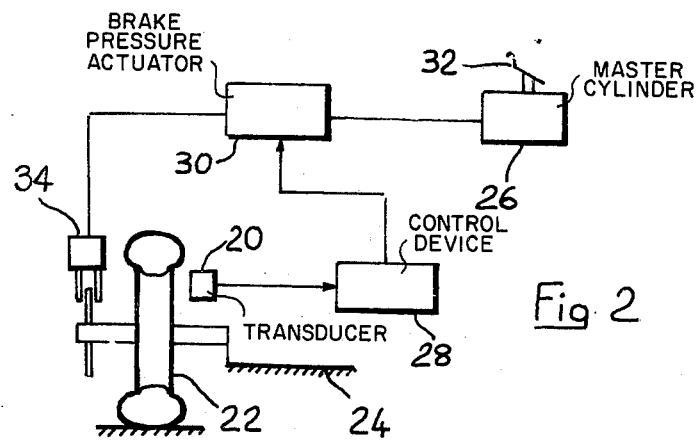
FIGS. 2 and 3 represent schematically a typical embodiment of the electronic circuit of an anti-skid braking system according to the invention.

With reference to FIG. 1, the wheel deceleration threshold is increased to a value $a_o$ in the first cycle of operation of the anti-skid braking system and, in subsequent cycles, is brought back to the optimal value $A_1$, as determined by tests and experiments, the optimal threshold value $A_1$ being typically about $1g$, where $g$ is the acceleration due to gravity.

Figure 3:
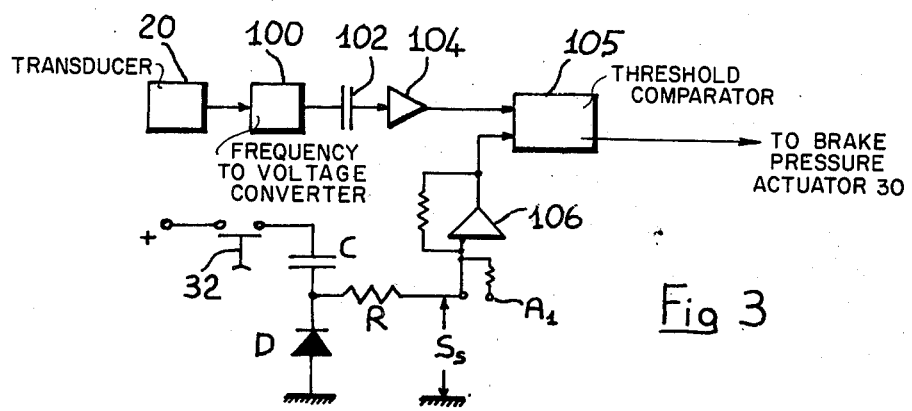

With reference to FIG. 3, the output of the speed transducer 20 is applied to a frequency-to-voltage converter 100 which provides an angular velocity voltage signal. The angular velocity signal is differentiated and amplified in a capacitor 102 and amplifier 104 and is applied to the first input of a threshold comparator circuit 105 having a second input to which a threshold voltage $A_1$ is normally applied, corresponging to the optimal deceleration threshold. The threshold comparator circuit 105 supplies an output to the pressure actuator 30 to effect brake release when the acceleration signal applied to the first input of the circuit 105 exceeds the threshold voltage applied to the second input.

To the threshold voltage $A_1$ an auxiliary voltage $S_s$ is added by means of a summing circuit 106. The auxiliary voltage $S_s$ corresponds to a fictitious deceleration value in the first brake application cycle; the voltage $S_s$ is derived from a resistor R, capacitor C and diode D, the anode of the latter being connected to ground. The auxiliary voltage $S_s$ is applied by the closure of an associated switch when the brake pedal 32 is depressed, since power is applied to the great majority of the anti-skid braking circuits when the brake pedal is depressed.

In subsequent cycles of the anti-skid braking system the voltage $S_s$ will have decayed to zero, so that in the second cycle of brake application the unmodified optimal deceleration threshold $A_1$ will be compared with the actual deceleration. The auxiliary voltage $S_s$ can be of any suitable magnitude, generated in any appropriate way, for example from the vehicle power source, and its application to the threshold comparator circuit can be controlled by means other than the brake pedal.

What is claimed is:

1. In a vehicle antiskid wheel braking system having a wheel angular velocity sensor; means connected to said angular velocity sensor for deriving a wheel deceleration signal; an electronic control circuit connected to said sensor; actuator means for controlling the pressure applied to the brakes in dependence upon the signals received from said control circuit; and comparator means for comparing said deceleration signal with a predetermined deceleration threshold level, said actuator means being connected to said comparator means and being controlled in dependence upon said wheel deceleration signal, wherein the improvement comprises: a summing circuit; an auxiliary voltage source providing an auxiliary voltage as one input to the summing circuit, said auxiliary voltage source comprising a series connected capacitance and diode, a resistor connected between the summing circuit and the junction of said series-connected capacitance and diode, means connecting the anode of the diode to ground and means connecting said capacitance to a power source of the vehicle; means providing said predetermined threshold voltage level as another input to the summing circuit, the output of the summing circuit comprising an increased threshold voltage level which is applied as a threshold level to the comparator circuit, and means rendering said voltage source inoperative after the first brake release cycle of operation of the antiskid braking system.

* * * * *